Dec. 21, 1926.  1,611,716

J. T. L. BROWN

MEASURING ELECTRICAL QUANTITIES

Filed July 9, 1921

Inventor:
John T. L. Brown.
by W. H. Beatty Atty.

Patented Dec. 21, 1926.

1,611,716

UNITED STATES PATENT OFFICE.

JOHN T. L. BROWN, OF NEW YORK, N. Y., ASSIGNOR TO WESTERN ELECTRIC COMPANY, INCORPORATED, OF NEW YORK, N. Y., A CORPORATION OF NEW YORK.

MEASURING ELECTRICAL QUANTITIES.

Application filed July 9, 1921. Serial No. 483,471.

This invention relates to measuring electrical quantities, and especially to measuring peak voltages.

The invention aims to provide for accurately measuring peak voltages of short duration. The invention also aims to provide for obtaining direct readings, as distinguished from obtaining readings by null or balance methods or by ballistic methods, and at the same time to provide for extending the range of such direct readings to voltages lower than can be thus directly read by means of an electrostatic voltmeter. Further, the invention aims to provide for obtaining continuous readings of slowly fluctuating peak voltages.

In accordance with the invention a condenser is charged through a rectifier, preferably of the vacuum tube type, by applying the voltage to be measured to the rectifier and the condenser. Heretofore, the voltage thus obtained across the condenser has been measured by an electrostatic voltmeter. In accordance with this invention, however, the voltage across the condenser is measured by employing a three electrode vacuum tube, this second tube having an input circuit connected across the condenser and having an output circuit containing a direct current meter. Thus, the voltage across the condenser acts as a "C" voltage or control voltage for controlling the value of the space current in the second tube. A feature of the invention is the reducing of the apparent leakage in the voltmeter tube, preferably by locating the control electrode outside of the direct electron discharge path from the filament to the anode, thereby increasing the accuracy of the readings.

Figure 1:
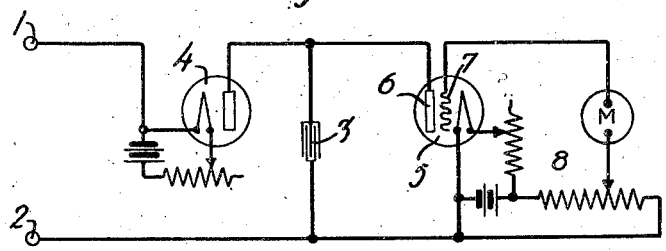
Figure 2:
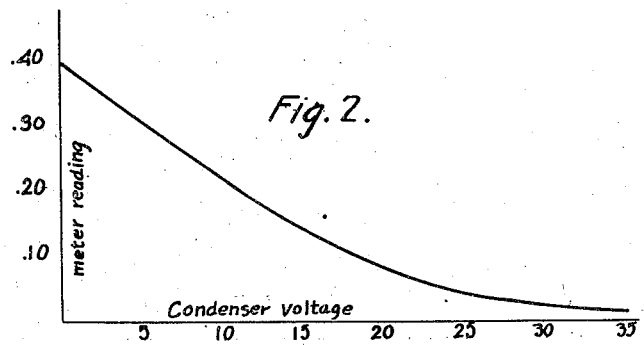
Figure 3:
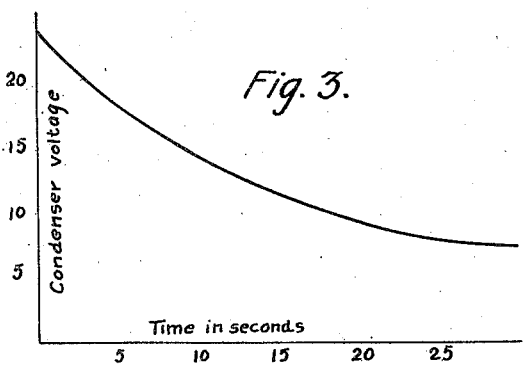
Figure 4:
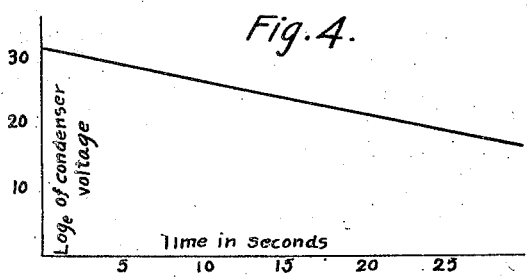

Fig. 1 of the accompanying drawings is a diagram of the preferred form of the invention; Fig. 2 is a calibration curve for a certain voltmeter circuit of the type shown in Fig. 1; Fig. 3 shows graphically how the voltage across the condenser of Fig. 1 decreases after the removal of an electromotive force which has been applied to the circuit of Fig. 1; and Fig. 4 is a logarithmic plot of this decrease of voltage with time.

In Fig. 1, terminals 1 and 2 are provided for connection to a source of varying electromotive force, the peak value of which it is desired to measure. The application of this source to terminals 1 and 2 causes condenser 3 to become charged to the peak voltage of the source, the charging current flowing through thermionic rectifier 4. The voltage thus obtained across the condenser acts as a "C" voltage or control voltage for controlling the value of the space current in the three electrode vacuum tube 5, the control electrode of this tube being shown at 6 and the anode being shown at 7. The plate electrode of this tube has been shown as the control electrode because, as explained hereinafter, it has been found desirable in many cases to have the control electrode located outside of the direct electron discharge path from the cathode to the anode and to accomplish this object it is often convenient to employ an ordinary three electrode vacuum tube which has the grid located between the plate and the filament but to use the plate electrode as a control electrode and the grid electrode as the anode. It should be noted that this reversal of the position of the anode and the control electrode with respect to the filament will also reverse the amplifying effect of the tube 5. The space current circuit of this tube includes a direct current indicating meter M. The filament heating battery for tube 5 has been shown as also supplying the space current for this tube, since for reasons given hereinafter, it is desirable to keep the maximum space current low and therefore the filament heating battery will often suffice to supply the space current. The space current when no voltage is applied to terminals 1 and 2 is adjusted to the maximum deflection of the space current meter M, the potentiometer 8 being used to effect this adjustment.

When a variable voltage is applied to terminals 1 and 2 the condenser 3 becomes charged to the maximum value of the voltage and the voltage to which the condenser is charged appears as a negative voltage on the control electrode 6 and reduces the reading of meter M. The voltmeter circuit is calibrated by applying known values of direct current voltages to the input electrodes of tube 5 and observing the corresponding readings of meter M. The curve of Fig. 2 is plotted from such observations. Knowing the calibration of the voltmeter circuit, the reading of meter M when an alternating electromotive force is applied to terminals 1 and 2 indicates the peak value of the voltage wave. The scale of meter M can, of course, be marked directly in terms of peak voltage if desired.

Any condenser effect in the vacuum tube 5 of the voltmeter circuit of this invention is negligibly small. This elimination of condenser effect renders possible the accurate measuring of peak voltages of very short duration, especially when adequate provision is made for insuring that the apparent leakage in the vacuum voltmeter tube is low; for when this leakage is sufficiently low the capacity of the condenser 3 may be made small, and since the total capacity to be charged through the rectifier is then small, the error in voltage measurements which is due to the IR drop in the rectifier will be small.

In any peak voltmeter which uses as a measure of peak voltage the potential difference between the terminals of a condenser which is connected through a rectifier to the applied source, two types of error are always present. The first, which will be referred to hereinafter as error "$a$", is caused by the IR drop in the rectifier, while the condenser is being charged. The second, which we shall call "$b$" comes from the fact that the condenser gradually loses the charge it attains through leakage. If the device is calibrated with direct current, the readings obtained for a variable E. M. F. will always be low by an amount depending upon the shape of the wave. If the nature of the wave is such that the peak voltage, or voltages close to the peak voltage, exist for a large percentage of the time, both of these errors will be small. This condition would exist if the peaks were broad. If, on the other hand, the peaks were very sharp, the errors "$a$" and "$b$" would be greater.

In order to obtain an idea of the magnitude of the error "$a$" to be expected, it is desirable to determine, in a circuit consisting of a condenser and a vacuum tube rectifier in series, the relation between the voltage $v$ across the condenser and the time $t$ during which a constant voltage E is applied to the circuit.

The characteristic of a vacuum tube of this type, used as a rectifier, can be represented with sufficient accuracy by the following empirical equation:

$$I = KV^n \quad (1)$$

in which I and V are the current and impressed voltage through and on the rectifier, respectively, and K and $n$ are constants depending upon the structure of the device.

A logarithmic plot of V against I, made from values observed for a particular tube that was used in the circuit of Fig. 1, proved to be a straight line, and from the slope and intercept of this line and the equation (1) the values of K and $n$ were found to be $1.23 \times 10^{-4}$ and 1.74, respectively.

Since, $V = E - v$ equation (1) becomes $$I = K(E - v)^n \quad (2)$$

Since I is current in the condenser, $$I = -C\frac{dv}{dt} \quad (3)$$

Eliminating I from (2) and (3), we obtain the differential equation, $$-C\frac{dv}{dt} = K(E-v)^n \quad (4)$$

The solution of (4) is, assuming that $v=0$ when $t=0$, $$t = \frac{C}{K} \cdot \frac{1}{1-n} \left[ E^{(1-n)} - (E-v)^{(1-n)} \right] \quad (5)$$

Let $d$ be the percentage error; i. e.

$$d = \frac{(E-v)100}{E} \quad (6)$$

Then, $$t = \frac{C}{K} \cdot \frac{1}{1-n} \left[ E^{(1-n)} - \frac{(d.E)^{(1-n)}}{100} \right] \quad (7)$$

The table which follows is computed from equation (7), using the values of K and $n$ stated above, and gives the value of $t$ for various values of $d$, E and C. These values will give some idea of the errors that may be expected from source of error "$a$" in an actual case, if something about the nature of the applied source is known.

| $t$ in seconds | $d$ in per cent | E in volts | C in M. F. | K | $n$ |
|---|---|---|---|---|---|
| .0165 | .1 | 10 | .05 | $1.23 \times 10^{-4}$ | 1.74 |
| .00292 | 1.0 | 10 | .05 | " | " |
| .000449 | 10.0 | 10 | .05 | " | " |
| .00487 | 1.0 | 5 | .05 | " | " |
| .00175 | 1.0 | 20 | .05 | " | " |
| .000584 | 1.0 | 10 | .01 | " | " |
| .00584 | 1.0 | 10 | .10 | " | " |

It is apparent from the third and sixth lines of these readings that, for the same order of magnitude of $t$ in the two cases, decreasing the capacity C from .05 to .01 M. F. decreased the error from 10% to 1%.

The rate at which the voltage $v$ across the condenser decreases after an applied voltage is removed, thereby producing error "$b$," can be expressed by the general relation for the discharge of a condenser through a resistance R which is in this case the leakage resistance.

$$v = Ee^{\frac{-t}{CR}} \quad (8)$$

Equation (8) shows that either C or R must be increased to make the error "$b$" small, but an increase in C increases the error "$a$" as shown in equation (7). It is therefore important to make the leakage resistance R as high as possible.

Leakage can take place across the condenser plates, in the wiring, or in the tubes themselves. Experiment showed that most of the leakage was in the tubes, if care was taken in insulating the wiring and if a good quality mica condenser was used. The voltmeter tube was found to cause most of the leakage and it was noted that the leakage increased with increase of space current. A possible explanation of this phenomenon is that the flow of electrons from filament to plate ionizes by collision some residual gas in the region of the grid. As the grid is negatively charged, some of the positive ions resulting from this ionization are attracted to it, thereby neutralizing some of its negative charge.

On the basis of this assumption, if the grid were out of the direct path of flow of the electrons from filament to plate and, consequently further from the positive ions when they are produced, the apparent leakage due to space current would not be as great. This result can be effected in practically any three-element vacuum tube by using the grid as a plate and the plate as a grid. A reversal of the plate and grid terminals in a type "E" tube used in the circuit of Fig. 1 was actually found to increase the leakage resistance several hundred times.

As the voltage across the condenser decreases with time when an applied voltage is removed, and as the space current must be kept low, the meter used to measure space current should come to its final position as quickly as possible and should have a high current sensitivity. A meter which has given satisfaction in the circuit of Fig. 1 is a type #57 Weston Wirechief's meter with a resistance of 800 ohms, giving a full scale deflection with .004 ampere.

The use of maximum space current of this value makes it unnecessary to supply additional "B" voltage, as a potentiometer bridged across the "A" battery of the voltmeter tube can be used for this purpose.

If the applied source is sustained, and not just a single peak, it is of advantage to record gradual fluctuations of peak voltage with time. This can be done by so adjusting the value of capacity that the voltage across the condenser decreases between successive peaks at a rate depending upon the rapidity of the fluctuations which are to be recorded. Such an adjustment does not necessarily introduce any additional error, for, as has been shown, an increase in the error "$b$" effected by a change in the capacity is always accompanied by a decrease in the error "$a$." The adjustment for minimum error depends upon the nature of the source, and cannot easily be determined except for a simple sine wave or a square wave.

By way of illustration, for one series of observations of gradual fluctuations of peak voltage with time the capacity selected was .05 M. F. In Fig. 3 the voltage decrease when an applied voltage is removed is plotted for this value of capacity. Fig. 4 is a logarithmic plot of the same from which the leakage resistance R was calculated and found to be 200 megohms.

What is claimed is:

1. The method of measuring voltages with a vacuum tube voltmeter having a vacuum tube with two electrodes and a third electrode between said two electrodes, which comprises passing a space current between said third electrode and one of said two electrodes, applying the voltage to be measured to said two electrodes, and measuring the variations produced in said space current by said voltage in terms bearing a known relation to the value of said applied voltage.

2. In an apparatus for measuring the maximum voltages of alternating current comprising a series connected condenser and rectifier, a vacuum tube having a cathode, an anode and a control electrode, said control electrode being located outside of the region of appreciable ionization within the tube, an input circuit for said vacuum tube including said condenser, an output circuit for said tube, and an indicating device in said output circuit.

3. A voltmeter comprising an electron discharge device having an electron emitting cathode, an anode and a control electrode, said control electrode being located outside of the region of appreciable ionization in said tube, input terminals connected to said cathode and control electrode, and a source of space current and a current indicating instrument in circuit with said cathode and anode.

In witness whereof, I hereunto subscribe my name this 6th day of July, A. D. 1921.

JOHN T. L. BROWN.